United States Patent [19]

Reichle et al.

[11] Patent Number: 4,905,470
[45] Date of Patent: Mar. 6, 1990

[54] ELECTROSTATIC FILTER FOR REMOVING PARTICLES FROM DIESEL EXHAUST

[75] Inventors: Ernst-Michael Reichle, Karlsfeld; Wolfgang Bulang, Eichenau, both of Fed. Rep. of Germany

[73] Assignee: Man Technologie GmbH, Munich, Fed. Rep. of Germany

[21] Appl. No.: 234,254

[22] Filed: Aug. 19, 1988

[30] Foreign Application Priority Data

Feb. 20, 1988 [DE] Fed. Rep. of Germany ....... 3805395

[51] Int. Cl.$^4$ ............................................. F01N 3/28
[52] U.S. Cl. ........................................ 60/275; 55/123;
55/131; 55/139; 55/DIG. 30; 60/297; 60/288;
60/311; 422/169
[58] Field of Search ................. 60/275, 297, 288, 311;
55/DIG. 30, 131, 139, 123 AC; 422/169

[56] References Cited

U.S. PATENT DOCUMENTS

| 3,157,479 | 11/1964 | Boles | 60/275 |
| 3,526,081 | 9/1970 | Kusters | 60/275 |
| 3,558,286 | 1/1971 | Gourdine | 60/275 |

FOREIGN PATENT DOCUMENTS

| 3235953 | 3/1984 | Fed. Rep. of Germany | 60/275 |
| 701007 | 1/1931 | France | 60/275 |
| 85415 | 5/1984 | Japan | 60/275 |

Primary Examiner—Douglas Hart
Attorney, Agent, or Firm—Ladas & Parry

[57] ABSTRACT

In the case of an electrostatic diesel exhaust filter the corona electrode and the collecting electrode are supplied with direct voltage with an AC component so as to obtain and even discharge. A catalyst, preferably in a noble metal catalyst, may placed upstream from the electrostatic filter in the exhaust gas pipe so that the hydrocarbons also contained in the exhaust gas may be oxidized.

7 Claims, 3 Drawing Sheets

ELECTROSTATIC FILTER FOR REMOVING PARTICLES FROM DIESEL EXHAUST

BACKGROUND OF THE INVENTION.

The invention relates to electrostatic filters for the removal of particles from diesel exhaust gases of the type comprising a corona electrode and a collecting electrode, which are supplied with DC.

Electrostatic filters of this type have for instance been proposed in the German patent application Ser. No. P 37 23 544. They have a first wire electrode which is associated with a cylindrical collecting electrode and which is connected with a source of DC.

It has been found that such a design does not produce an even field along the corona electrode and that this impairs the filtering efficiency.

SUMMARY OF THE INVENTION.

One object of the present invention is to improve a filter of the type described for optimizing the reduction of contaminants in exhaust gases of diesel engines.

In order to achieve this or other objects appearing from the present specification and claims the filter furthermore includes a high voltage supply providing a direct voltage with an alternating current component.

Owing to the provision of an alternating current component with the direct current, there has surprisingly been found to be a substantial reduction in the emission of particles in diesel exhaust.

The invention is based on the discovery that if the electrodes are supplied with direct current an irregular corona discharge will become established along the corona electrode, some zones being almost without any discharge. Owing to the modulation of the current supplied with alternating voltage it is possible to eliminate such irregularity in the corona discharge so that it is possible to ensure an effective conveyance of the particles along the whole length of the filter.

The filtering action may furthermore be enhanced by connecting the corona electrode with the negative terminal of the supply.

As is known, the exhaust gases of diesel engines contain hydrocarbons in addition to particles of carbon. During operation under a light load the hydrocarbons predominate and under a full load the carbon particles predominate. Attempts are currently being made to restrict the emission of such contaminants to be within certain limits. Since these limits are not able to be adhered to simply by modifying the internal design of the engine, it is necessary to treat the exhaust gas in some manner after it has left the engine in order to reduce emission to be within the required limits.

In view of the dual structure of these contaminants the treatment of the exhaust gas is often undertaken in two stages, namely with a particle filter and a catalyst. In accordance with the European patent 20,766 this treatment is performed in such a manner that the exhaust gas system is fitted with a particle filter with a depth effect and a made of a porous material and a following catalyst for conversion of the hydrocarbons.

This known system is equipped with a burner in order to oxidize the particles retained in the filter. For continuous operation of the system two filters are provided, through which the exhaust gases and the hot gases from the burner are caused to flow.

Downstream from the filter the exhaust gas system is so designed that it is only the exhaust gases from the diesel engine which flow through the sing catalyst, whereas the hot gases from the burner, after flowing through the second filter, flow through a bypass with the result that the exhaust gases reach the catalyst while at a relatively low temperature which means that no complete oxidation of the hydrocarbons is not possible.

The system provided by the invention may be further enhanced if a catalyst is placed upstream from the electrostatic filter.

Owing to the provision of such a catalyst upstream from the filter and the use of an electrostatic filter for conversion of the particles a converter is obtained by which a substantial reduction in the contaminant content of diesel exhaust is possible without the necessity of providing for regeneration operations and without substantial or fluctuating pressure losses in the exhaust gas system. It is then readily possible to keep within statutory limits for contaminant emission by suitably dimensioning and designing the converter in each respective case. Furthermore, in this system there is no danger of thermal damage.

In accordance with a further development of the invention the catalyst is arranged in the exhaust duct near the engine so that the catalyst will have a high temperature in all operational states of the engine and this will be conducive to a maximum conversion rate of hydrocarbons.

Preferably a noble metal catalyst is employed in which the platinum fraction predominates.

Noble metals are also able to catalyze oxidation of sulfur dioxide which is produced by the combustion of sulfur in the fuel, to the trioxide which combines with water to form sulfuric acid, but since this is undesired, in the invention the catalyst unit is so designed in its dimensions that oxidation of the sulfur dioxide is substantially avoided. This makes it possible to take advantage of the effect that the reaction of the sulfur trioxide takes place more slowly than that of the hydrocarbons. Owing to the optimization of the size of the catalyst or of the space velocity, respectively, it is thus possible to substantially suppress the oxidation of sulfur dioxide. The fact that the catalyst is mounted near the engine also leads to a certain reduction in the conversion of sulfur dioxide, since such conversion decreases at temperatures in excess of 500° C. owing to the thermodynamic equilibrium.

In accordance with a further development of the invention the catalyst unit is so constructed that exhaust gas flows around at least part of it. In this case it is possible for a catalyst to be arranged in a less favorable temperature range in order to achieve more advantageous reaction conditions for the two components, namely sulfur dioxide and hydrocarbons.

The catalyst carrier may be any refractory material with a coarse structure, such as a ceramic or refractory metallic material. As a result the particles not yet filtered out of the exhaust gases are not retained so that the slight drop in pressure caused by the catalyst carrier remains constant in time.

Furthermore for the electrostatic filter a corona electrode is preferred which consists of a thin wire or a thicker one with an acicular covering thereon so than when the high voltage is applied between the corona electrode and the collecting electrode a maximum corona discharge is formed and oxygen ions are activated which aid in the oxidation of the diesel exhaust gas particles.

The electrostatic filter is preferably so designed that owing to the electrostatic field the particles are caused to move out of the current of exhaust gas and into a quiescent zone. This means that the residence time of the particles within the electrostatic filter is prolonged and they are oxidized by the remaining oxygen in the exhaust gas and the oxygen ions formed in the filter and the OH radicals are oxidized.

For this purpose a suitable form of filter is a cylindrical one with the filamentary corona electrode aligned with its axis and with collecting walls having a coarse structure arranged at its periphery, in which the particles are trapped and such oxidation may be promoted by the presence of a catalytic coating on the collecting structure.

Working embodiments of the invention will now be described with reference to the accompanying drawings.

DESCRIPTION OF THE SEVERAL FIGURES OF THE DRAWINGS

DETAILED DESCRIPTION OF WORKING EXAMPLES OF THE INVENTION

Figure 1:
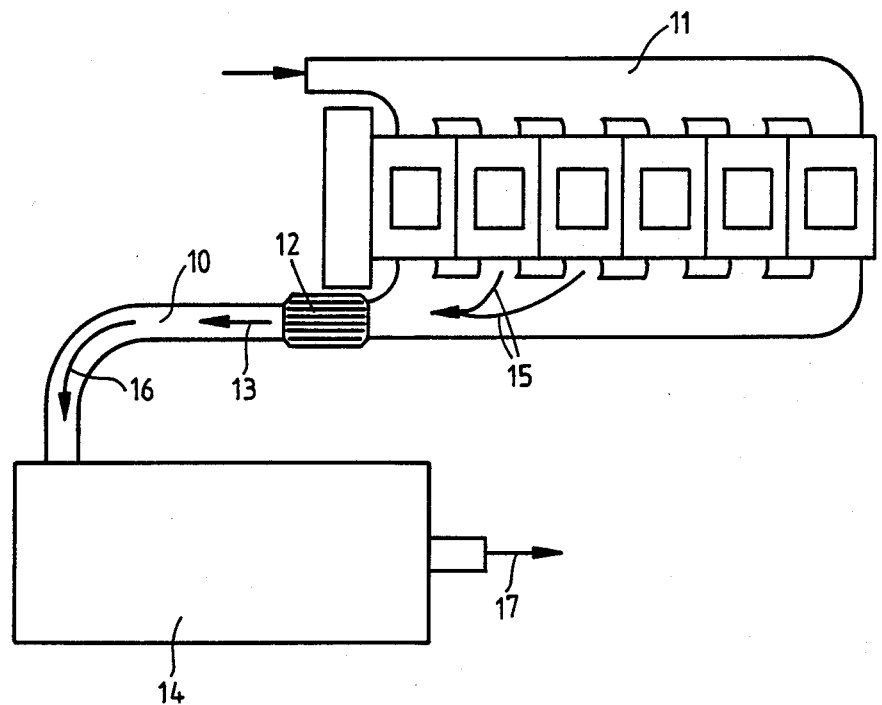
FIG. 1 shows an exhaust system with an exhaust gas converter.

A catalyst 12 is arranged in the proximity of the outlet of an exhaust gas duct of a diesel engine 11 as part of the exhaust gas system 10. In the direction of flow as indicated by arrow 13 downstream from the catalyst 12 there is an electrostatic filter in the said system 10. The exhaust gases 15 laden with contaminants coming from the cylinders of the engine enter the catalyst 12 still at more or less the cylinder temperature and in the catalyst the hydrocarbons are oxidized, such oxidation being favored by the high temperature. A more or less complete oxidation may be achieved by the use of a noble metal catalyst and by having a minimum space velocity of the exhaust gases. If the hydrocarbons are not to be oxidized, then the catalyst 12 will obviously be omitted.

The exhaust gases 16 freed of the hydrocarbons but still charged with carbon particles then pass into the electrostatic filter 14 in which the particles are separated from the gas and are oxidized so that the exhaust gases 17 are essentially freed of contaminants.

Figure 2:
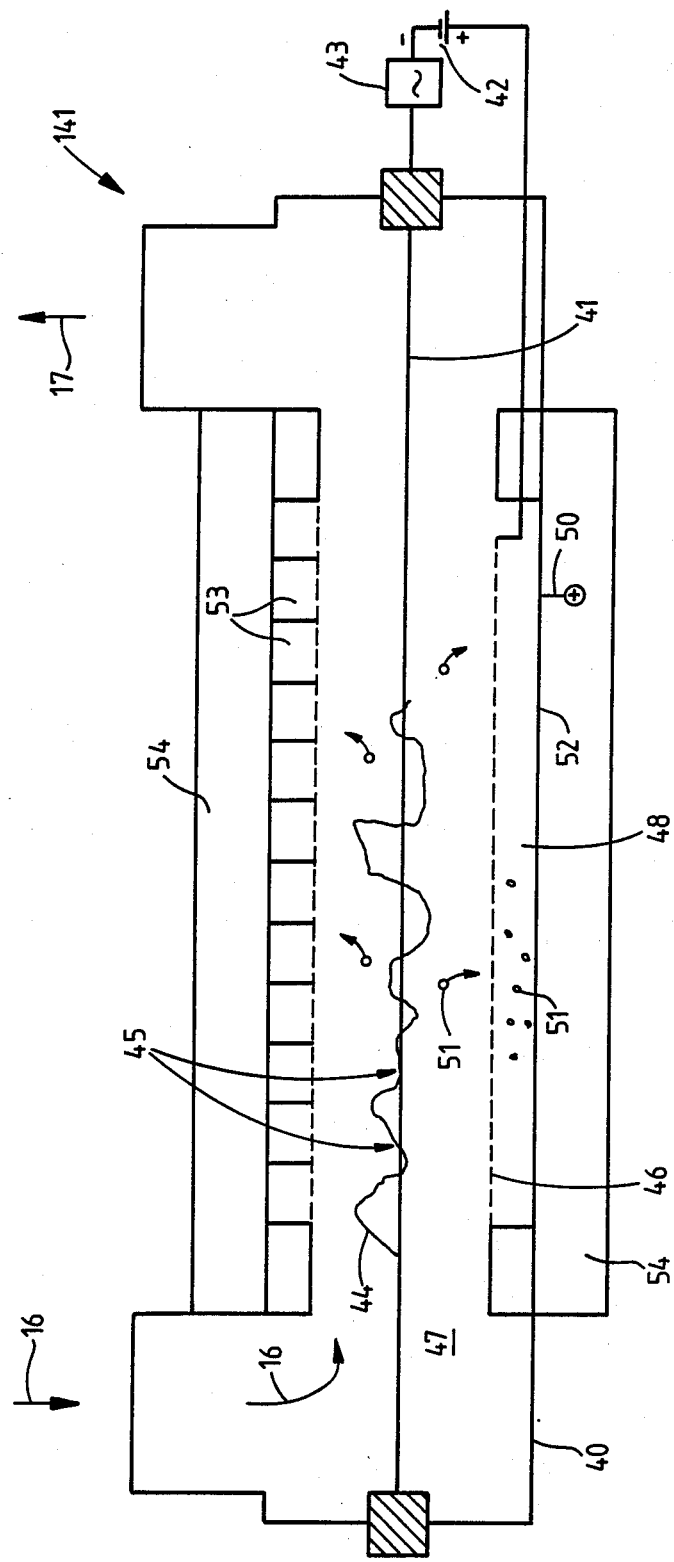
FIG. 2 shows one possible design of an electrostatic filter in longitudinal section.

In the longitudinal section in FIG. 2 an electrostatic filter 141 will be seen to have an essentially cylindrical filter housing 40 with a corona electrode 41 extending along the axis of the housing. The corona electrode 41 is connected with a source of direct current 42 which is mixed with alternating current 43. The corona electrode 41 is made negative. If the electrostatic filter is operated with direct current, the discharge along the corona electrode 41 would be very irregular as is indicated by the curve 44, zones 45 only experiencing little or no discharge. Such reduced discharge effect would not be sufficient for a filtering action. Owing to the superimposition of the alternating current on the direct current compensation is achieved so that there is a generally even or constant discharge along the entire electrode 41.

The alternating current used may have a medium or radio frequency.

The filter housing 40 is divided by metallic wall 46, in the form of woven wire or a similar structure, into a flow space 47, and a header space in which the gas is quiescent and screened off from the space 47. The exhaust gas enters the flow space 47, where the particles 51 contained in it are charged by the powerful corona discharge and are deflected towards the metallic wall 46 by the action of the electric field. Some of the particles pass through the wall and pass into the quiescent zone 48 of the filter housing 40. In order to promote entry of the particles into the quiescent zone 48 it is possible to provide a tractive voltage 50 between the metallic wall 46 and the housing 40.

The particles 51 have a longer residence time in the quiescent zone 48 or become deposited on the outer wall 52 of the filter housing 40 for a brief while. In the quiescent space 48 any residual motion may be further reduced by the division of the space into the chambers 53 as is shown in the upper part of FIG.2 .

The combustible particles 51 are oxidized in the quiescent zone 48 and 53, respectively, and also adjacent to the corona electrode 41 by the residual oxygen in the exhaust gas 16 and by excited oxygen molecules and OH radicals, which are produced owing to the interaction of the electrons with the oxygen and water vapor in the flow space 47. To accelerate the oxidation process at higher temperatures the filter may be externally provided with thermal insulation. Providing an air supply into the filter 40 leads to an improvement in the reaction rate in the full load operational range of the engine. A further measure for improving the effectiveness of the filter is the incorporation of a pulsation damper, for example a muffler, upstream from the filter in order to ensure that the process of oxidation of the particles 51 is not impaired by pressure surges.

Figure 3:
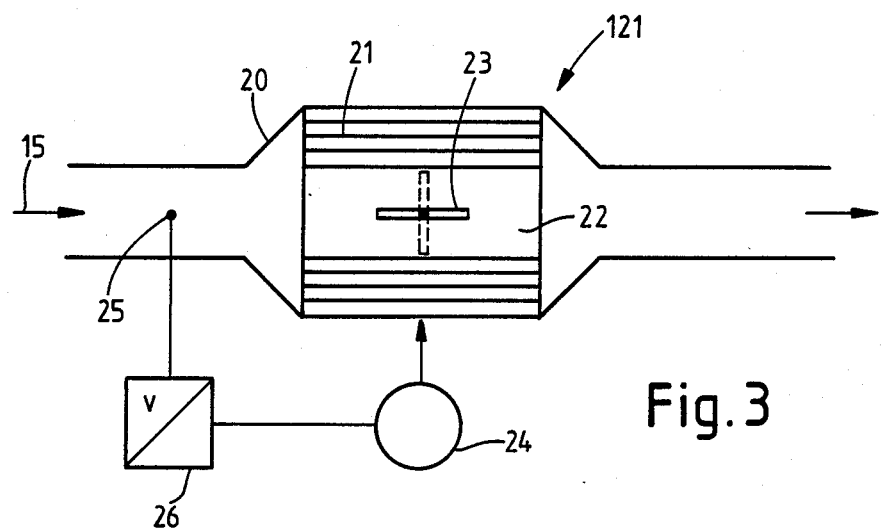
FIG. 3 shows one form of a catalyst in a detailed longitudinal section.

As will be seen from the longitudinal section of the catalyst 121 in FIG. 3 a widened section 20 of the exhaust pipe contains a honeycomb catalyst carrier 21, which is in the form of an annulus and in its middle part defines a free passage 22. In the passage 22 there is a door 23 which when needed may be shifted by means of a motor 24 in accordance with the temperature of the entering exhaust gas 15. There is a temperature sensor 25 and an automatic controller 26 for performing this function.

The catalyst carrier may have a honeycomb or cellular structure and be made of ceramic material or sheet metal, but any structure is suitable such as those made of corrugated sheet metal, woven wire with a large mesh size etc, which only lead to a small pressure decrease in the exhaust gas system.

Figure 4:
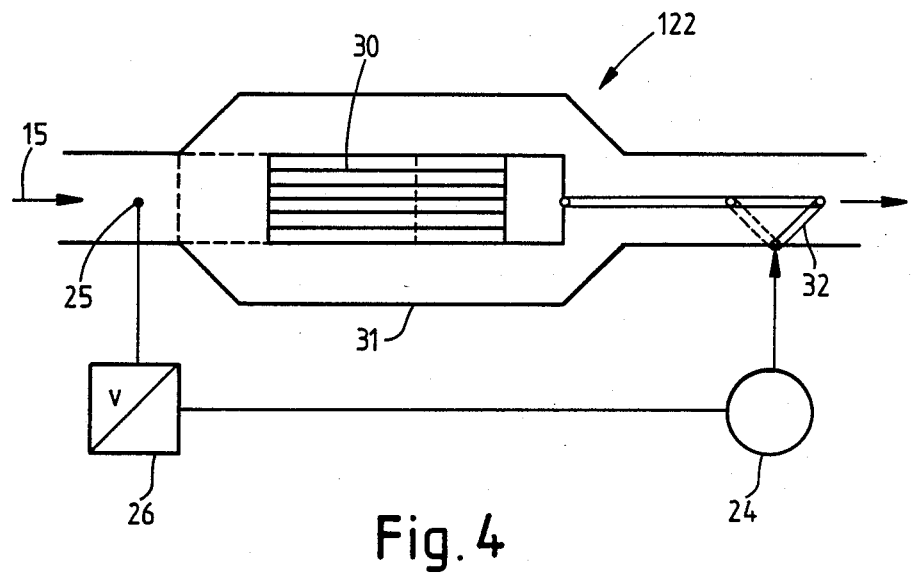
FIG. 4 shows a further possible form of catalyst.

In the further catalyst design shown in FIG. 4 the catalyst 122 has a carrier 30 arranged centrally in the housing 31 in such a manner that the exhaust gases 15 are able to flow around the catalyst carrier 30. An automatically controlled door 32 is arranged in a cooler external zone downstream from the catalyst 31. For the oxidation of hydrocarbons the catalyst is a noble metal whose catalytic layer consists predominantly of platinum which may be mixed with other noble metals such as rhodium and palladium. The noble metals also however catalyze the oxidation of sulfur dioxide, which is produced by the combustion of the sulfur in the fuel, to sulfur trioxide. The latter then combines with the water in the exhaust gas to form sulfuric acid. The oxidation of sulfur dioxide is very temperature dependent and under 250° C. the reaction is kinetically hindered and over 500° C. it is reduced because of the thermodynamic equilibrium. For this reason as well mounting the catalyst 12 as near as possible to the engine 11 is an advantage. On the other hand the reaction of sulfur dioxide does not take place as rapidly as that of the hydrocarbons. Taking this into account, and optimizing the size of the catalyst and the rate of flow through the catalyst of the exhaust gases it is possible to so influence the oxidation of the sulfur dioxide that such oxidation is largely suppressed. However this entails a decrease in the reduction of hydrocarbons. The possibility of causing flow bypass around the catalyst carrier 21 or 30, respectively, and the regulation of the bypassing gas in accordance with the exhaust gas temperature makes possible an optimum balance between the reduction in the conversion of sulfur dioxide and an increase in the conversion of hydrocarbons.

We claim:

1. Filtering apparatus for exhaust gas from a diesel engine comprising an electrostatic filter for removing particles from diesel exhaust gas comprising a corona electrode and a collecting electrode, and means for applying a high voltage to the filter in the form of a direct voltage and an alternating voltage superimposed thereon, and a catalyst arranged upstream from said electrostatic filter for oxidizing hydrocarbons, the diesel engine having an exhaust pipe, said catalyst being arranged in said exhaust pipe in proximity to said engine, said catalyst comprising a noble metal and being of such size that oxidation of sulfur dioxide in the gas is substantially avoided, said catalyst being dimensioned to provide high velocity exhaust gas therethrough to suppress oxidation of the sulfur dioxide in the exhaust gas and to provide flow of exhaust gas at least partly around said catalyst.

2. The filter apparatus as claimed in claim 1 wherein said alternating voltage is a medium frequency voltage.

3. The filter apparatus as claimed in claim 1 wherein said corona electrode is negatively poled.

4. The filter apparatus as claimed in claim 1 comprising means defining a quiescent zone for the exhaust gas, said filter being designed to deflect said particles by said electrostatic field out of an exhaust gas current in said filter into said quiescent zone.

5. The filter apparatus as claimed in claim 4 comprising a catalytic coating in said quiescent zone.

6. The filter apparatus as claimed in claim 1 comprising flow control means for controlling area of flow for the exhaust gas through the catalyst, temperature sensing means upstream of said catalyst and means connecting the flow control means and the temperature sensing means for operating the flow control means on the basis of the exhaust gas temperature upstream of the catalyst.

7. The filter apparatus as claimed in claim 6 wherein said catalyst comprises a housing and a catalyst carrier mounted in said housing with clearance so that exhaust gas can flow around said catalyst carrier, said flow control means being located downstream of said catalyst carrier.

* * * * *

UNITED STATES PATENT AND TRADEMARK OFFICE
CERTIFICATE OF CORRECTION

PATENT NO. : 4,905,470
DATED : March 6, 1990
INVENTOR(S) : Ernst-Michael REICHLE and Wolfgang BULANG It is certified that error appears in the above-identified patent and that said Letters Patent is hereby corrected as shown below:

On the title page, Item (73) correct the printing of the Assignee name from:

"Man Technologie GmbH, Munich" to

"MAN Technologie GmbH, Munich"

Signed and Sealed this

Twentieth Day of April, 1993

*Attest:*

MICHAEL K. KIRK

*Attesting Officer*  Acting Commissioner of Patents and Trademarks